United States Patent [11] 3,600,626

[72] Inventor George A. Kupsky
 Milford, N.J.
[21] Appl. No. 880,347
[22] Filed Nov. 26, 1969
[45] Patented Aug. 17, 1971
[73] Assignee Burroughs Corporation
 Detroit, Mich.

[54] MULTICELL DISPLAY DEVICE HAVING COMMUNICATION PATHS BETWEEN ADJACENT CELLS
2 Claims, 5 Drawing Figs.

[52] U.S. Cl. ........................................ 313/220,
 313/109.5, 315/169
[51] Int. Cl. ...................................... H01j 61/30

[50] Field of Search ............................ 313/109.5,
 220; 315/168, 169

[56] References Cited
UNITED STATES PATENTS
2,967,965  1/1961  Schwartz .................. 315/169 X Primary Examiner—Raymond F. Hossfeld
Attorneys—Kenneth L. Miller and Robert A. Green ABSTRACT: A display panel having a plurality of gas-filled cells arrayed in rows and columns and having gas communication paths between adjacent cells formed by properly overlaying and offsetting plates having identical openings so that portions of corresponding openings form the cells and other portions form the gas communication paths between cells.

INVENTOR.
George A. Kupsky
BY Robert A. Green
ATTORNEY

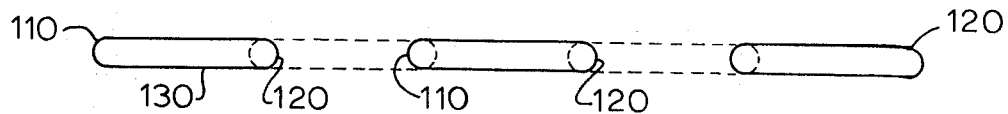

MULTICELL DISPLAY DEVICE HAVING COMMUNICATION PATHS BETWEEN ADJACENT CELLS

BACKGROUND OF THE INVENTION

Display panels comprising a plurality of gas-filled cells which can be turned on selectively to display a message are known in the art. A display panel has recently been developed which uses gas communication paths between display cells to provide economies in the driving circuitry. Method of making such paths are of interest.

SUMMARY OF THE INVENTION

Briefly, according to the invention, a multicell gaseous display device utilizes apertured plates assembled in a unique manner to provide gas communication paths between cells.

DESCRIPTION OF THE DRAWING

FIG. 4 is a schematic representation of a portion of the display panel of FIG. 1; and FIG. 5 is a schematic representation of the display panel of FIG. 1 and a circuit in which it may be operated.

DESCRIPTION OF THE PREFERRED EMBODIMENTS

Figure 1:
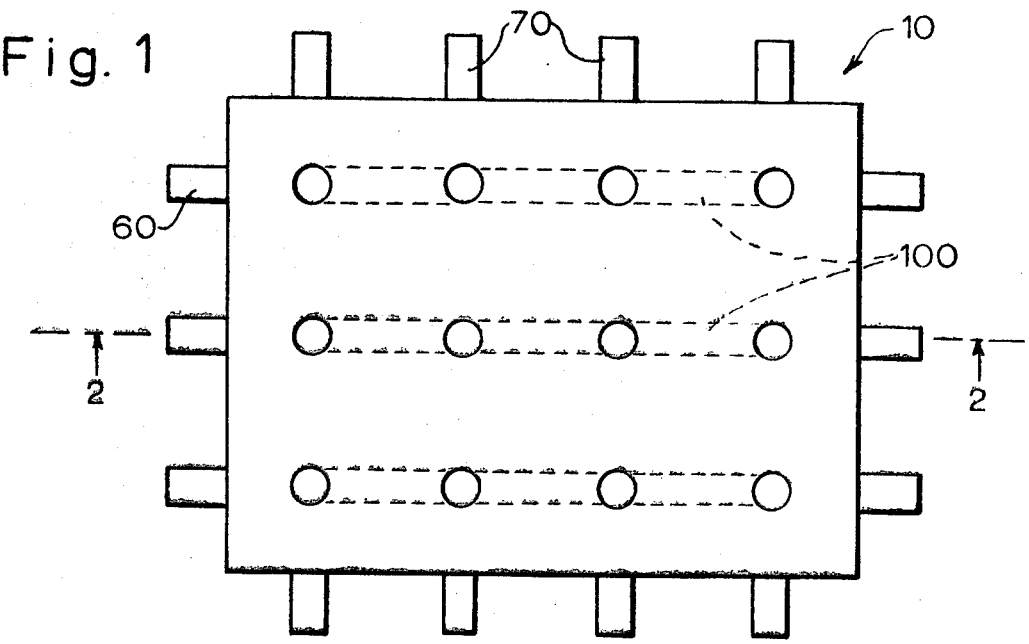
FIG. 1 is a schematic plan view of a display panel embodying the invention.

It is to be understood that the display panel described herein may have substantially any desired size and shape, and it may include substantially any number of display cells. The panel may also include any suitable ionizable gas such as neon, argon, xenon, etc. singly or in combination. A metal such as mercury, is also usually included in the gas to minimize cathode sputtering. In addition, in the following description of the operation of the invention, reference is made to scanning from cell to cell or glow transfer from cell to cell. This is to be construed to mean either that glow in one cell is actually transferred from an ON cell to an OFF cell, and the OFF cell turns ON, or that glow in one cell produces excited particles and metastable atoms which diffuse from an ON cell to an adjacent OFF cell and can be used to facilitate the firing and turning ON of the adjacent cell.

A display panel 10 embodying the invention includes a top glass viewing plate 20 and an insulating bottom plate 30 of glass, ceramic, or the like, a set of electrodes 60, a set of electrodes 70, and a multiplate assembly which forms a plurality of rows and columns of gas-filled display cells having gas communication paths between columns of cells.

Figure 2:
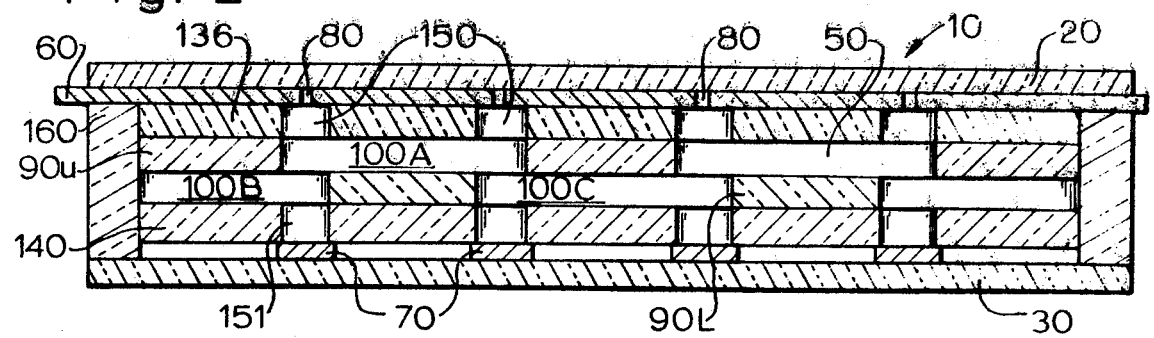
FIG. 2 is a sectional elevational view along the lines 2–2 in FIG. 1.
Figure 3:
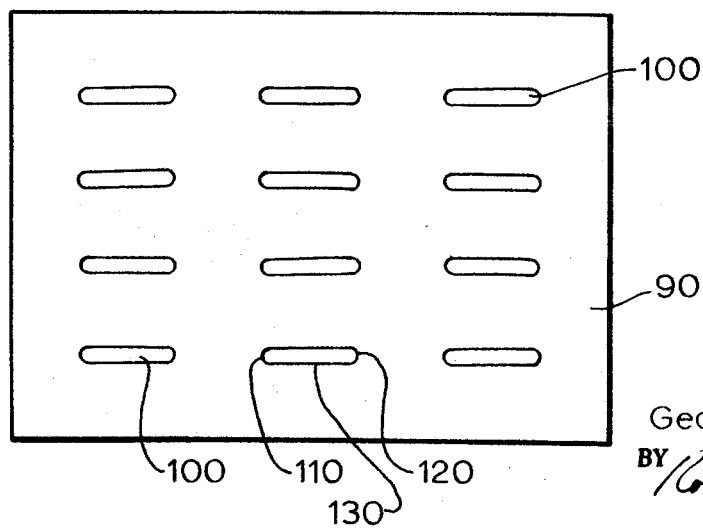
FIG. 3 is a plan view of a portion of the display panel of FIG. 1.

According to the invention, the aforementioned multiplate assembly includes a pair of insulating plates 90 (FIGS. 2, 3, 4) of mica, glass, or the like which are provided with identical elongated openings or slots 100. Each plate includes a plurality of groups of openings or slots 100 which are arrayed in rows and columns, with the openings in each row having their short axes aligned vertically and their long axes aligned horizontally as shown and with the axes of the rows spaced apart parallel to each other. Each opening 100 has semicircular left end 110 and right end 120 and an intermediate connecting portion 130. Each opening has a particular dimension, say 0.060 inches, between the centers of the left and right semicircular ends 110 and 120, and the spacing between centers of the right end and left end portions of adjacent openings in each row has the same 0.060 inch dimension.

In panel 10, the two plates 90 are put together in a sandwich with the rows of openings or slots 100 vertically aligned, but with the plates offset (FIGS. 2 and 4) so that the left end 110 of a slot 100A in the upper plate 90U is vertically aligned with the right end 120 of the slot 100B in the lower plate 90L directly beneath it. This places the right end of the same slot 100A in the upper plate directly over the left end of the adjacent slot 100C in the lower plate. At the same time, the intermediate portion 130 of the slot 100A in the upper plate provides communication between the right end of the slot 100B in the lower plate and the left end of the adjacent slot 100C in the lower plate. Thus, the one slot 100B in the lower plate is coupled to the adjacent slot 100C in the lower plate through the slot 100A above it. In this same way, it can be seen that, in each row of slots, the slots are connected together in a path which extends from a slot in the lower plate through a slot in the upper plate, back to a slot in the lower plate, to a slot in the upper plate, etc.

The cell assembly is completed by top and bottom insulating plates 136 and 140, between which plates 90 are secured. The plates 136 and 140 are provided with tiny apertures 150 and 151, respectively, arrayed in rows and columns and vertically aligned with the vertically aligned ends 110 or 120 of the slots in plates 90. Thus, a plurality of vertical gas cells are provided, each including an aperture 151, slot ends 110 and 120, and an aperture 150. Cells 150 are referred to as the display cells of panel 10 since these cells are closest to, and are seen by, a viewer looking through top plate 20.

Referring now to electrodes 60 and 70, electrodes 60 are disposed between cover plate 20 and apertured plate 136, and each electrode is aligned with a series of cells 150, and a second lower array of parallel electrodes 70, each of which is aligned with a series of cells. The electrodes 60 are oriented at 90° to the second electrodes 70, and, for purposes of this description, it is considered that each upper electrode is aligned with a row of cells and each lower electrode is aligned with a column of cells. The electrodes cross each other at a cell, and each cell has an electrode 60 and an electrode 70 associated with it. The electrodes may be flat strips or wires, and the upper electrodes 60 either include apertures 80 through which the cells can be viewed, or they are positioned or shaped to permit the required viewing. One set of electrodes is operated as cathodes, and one set as anodes, as desired.

Usually, the top and bottom plates 20 and 30 are larger in area then the other plates disposed between them, and a gastight seal is formed about the periphery of the panel by means of an insulating material 160, such as a glass frit, or the like. The electrodes 60 and 70 extend beyond the edges of the panel so that the necessary electrical connections can be made. The gas content of the cells can be introduced by means of a tubulation (not shown) secured to the top or bottom plate 30 or 40, or in any other suitable manner.

Panel 10 having gas communication paths between columns of cells is particularly suited for operation by a method described and claimed in copending application Ser. No. 850,984, filed Aug. 18, 1969, and illustrated schematically in FIG. 5. Briefly, in this mode of operation, each column of cells is fired in turn from left to right, and glow is modulated in accordance with an applied signal routine which properly energizes selected cells in each column. The columns are cycled continually and at a rate sufficient to cause a message or picture to be displayed by the cells which are caused to glow. As the cycling continues and the input information changes, the displayed message changes. This mode of operation is achieved by connecting the cathodes, say electrodes 70, in groups as shown, with each group connected to its own driver circuit 200 which applies generally negative potential thereto. Each anode 60 is connected to a current source driver circuit 210 which applies generally positive potential thereto, and the necessary synchronizing circuits 220 are provided to synchronize the operation of the anodes and cathodes.

In this scanning mode of operation, cells which are ON generate excited particles including metastable atoms which flow or diffuse from the ON cells through slots 100 to the adjacent cells to facilitate turn on of the adjacent cells when operating potentials are applied to them. Thus, even though the cathodes are connected in groups, only the cathode and the associated cells, immediately adjacent to a column of ON cells, have sufficient voltage applied to them and receive sufficient excited particles to be able to turn on. In operation, the first cathode driver 200A and the anode drivers are operated to turn on the first column of cells. This first step is usually facilitated by a keep-alive or starter cell (not shown) which provides first electrons for the first column of cells so that they turn on preferentially. This stimulus is not available to the fourth column of cells, which are also connected to driver 200A, and these cells do not turn on. Next, the first cathode driver 200A is turned off, and the second cathode driver 200B is energized to apply cathode potential to the second cathode and to the second column of cells, and, the anode drivers are energized to cause cells in the second column to turn on. This operation is carried out with each column of cells in turn, as described briefly above.

I claim:

1. A multicell gas-filled display device comprising
a flat panel-type envelope containing an ionizable gas and including a top viewing plate, a bottom insulating plate, and a cell assembly between them all sealed together around their edges,
said cell assembly including
  first and second insulating plates having identical arrays of slots and held together in a sandwich but offset so that a continuous free communication path is formed from a slot in the first plate through a slot in the second plate, through a slot in the first plate etc.
  portions of said slots in said plates being vertically aligned to form vertical cells,
  a third insulating plate having rows and columns of first apertures and positioned adjacent to said first insulating plate with each of its apertures aligned with one of said vertical cells,
  a fourth insulating plate having rows and columns of second apertures and positioned adjacent to said second insulating plate with each of its apertures aligned with one of said vertical cells,
  each combination of a first and second aperture and a vertical cell comprising a display cell, and
  a first electrode array between said top plate and said third plate and a second electrode array between said bottom plate and said fourth plate, each first electrode being aligned with a row of display cells and each second electrode being aligned with a column of display cells.

2. A multicell gas-filled display device comprising
a flat panel-type envelope containing an ionizable gas and including a top viewing plate, a bottom insulating plate and a cell assembly between them all sealed together around their aligned edges,
said cell assembly including
  a first insulating plate having a plurality of first elongated openings therein, each opening having a right end, a left end, and an intermediate portion,
  a second identical insulating plate having a plurality of second identical elongated openings therein, each having a left end, a right end, and an intermediate portion,
  said second plate being seated on said first plate with the openings in one offset from the openings in the other and aligned in part,
  said alignment comprising having the left end and right end of each opening in said second plate vertically aligned with the right end and left end, respectively, of the openings in said first plate with the intermediate portion of each second opening being seated on the solid portions of said first plate between its first openings, the intermediate portions of said openings in said first plate being positioned beneath solid portions of said second plate between its second openings, whereby said aligned ends of said openings form vertical cells and the intermediate portions constitute lateral gas communication paths between said vertical cells,
  said path extending from the right end of one opening in said first plate to a left end of an opening in said second plate and through the intermediate portion and right end of said last-named opening to the left end of the next adjacent first opening in said first plate and through the intermediate portion and right end of said adjacent opening to the left end of the next adjacent opening in said second plate, etc.,
  a third insulating plate having rows and columns of first apertures and positioned adjacent to said first insulating plate with each of its apertures aligned with one of said vertical cells,
  a fourth insulating plate having rows and columns of second apertures and positioned adjacent to said second insulating plate with each of its apertures aligned with one of said vertical cells,
  each combination of a first and second aperture and a vertical cell comprising a display cell, and
  a first electrode array between said top plate and said third plate and a second electrode array between said bottom plate and said fourth plate, each first electrode being aligned with a row of display cells and each second electrode being aligned with a column of display cells.